US012661913B2

(12) United States Patent
Kawasaki et al.

(10) Patent No.: US 12,661,913 B2
(45) Date of Patent: Jun. 23, 2026

(54) PRINTING APPARATUS, SHEET CONVEYING APPARATUS, AND SHEET TENSION ADJUSTMENT METHOD

(71) Applicant: CANON KABUSHIKI KAISHA, Tokyo (JP)

(72) Inventors: Kota Kawasaki, Kanagawa (JP); Masahiro Sugimoto, Kanagawa (JP); Junichi Ochi, Shizuoka (JP); Takuma Nakamura, Tokyo (JP); Yuichiro Yanagi, Chiba (JP)

(73) Assignee: Canon Kabushiki Kaisha, Tokyo (JP)

( * ) Notice: Subject to any disclaimer, the term of this patent is extended or adjusted under 35 U.S.C. 154(b) by 134 days.

(21) Appl. No.: 18/647,416

(22) Filed: Apr. 26, 2024

(65) Prior Publication Data

US 2024/0359492 A1 Oct. 31, 2024

(30) Foreign Application Priority Data

Apr. 28, 2023 (JP) ................................ 2023-074659

(51) Int. Cl.

*B41J 15/16* (2006.01)
*B41J 15/04* (2006.01)
*B41J 25/304* (2006.01)
*B65H 20/02* (2006.01)
*B65H 23/04* (2006.01)
*B65H 23/16* (2006.01)

(52) U.S. Cl.

CPC ............ *B41J 15/165* (2013.01); *B41J 15/04* (2013.01); *B41J 15/16* (2013.01); *B41J 25/304* (2013.01); *B65H 20/02* (2013.01); *B65H 23/044* (2013.01); *B65H 23/16* (2013.01); *B65H 2404/1441* (2013.01)

(58) Field of Classification Search

CPC . B41J 15/165; B41J 15/04; B41J 15/16; B41J 25/304; B65H 20/02; B65H 23/044; B65H 23/16; B65H 2404/1441

See application file for complete search history.

(56) References Cited

U.S. PATENT DOCUMENTS 8,960,891 B2 2/2015 Hacker et al.
2015/0077490 A1* 3/2015 Miyasaka .......... B41J 11/00218 347/102
2018/0244485 A1* 8/2018 Takahashi ............ B65H 23/185

(Continued)

FOREIGN PATENT DOCUMENTS

JP 2014-522350 A 9/2014

*Primary Examiner* — Henok D Legesse
(74) *Attorney, Agent, or Firm* — Venable LLP

(57) ABSTRACT

A sheet conveying apparatus includes a supply unit for supplying a sheet; a switching unit disposed on a conveyance path of the sheet and configured to switch between a state of nipping the sheet supplied by the supply unit and a state of releasing the nipping of the sheet; a tension applying unit disposed on one side of the switching unit in a conveyance direction of the conveyance path and configured to apply tension to the sheet; and a detection unit disposed on the other side of the switching unit in the conveyance direction of the conveyance path and configured to detect the tension of the sheet. In a state where the nipping of the sheet is released by the switching unit, the first tension applying unit adjusts the tension of the sheet while the detection unit detects the tension of the sheet.

15 Claims, 16 Drawing Sheets

(56) References Cited

U.S. PATENT DOCUMENTS

| | | | | |
|---|---|---|---|---|
| 2024/0109346 | A1* | 4/2024 | Fujiwara | B41J 15/16 |
| 2024/0217249 | A1 | 7/2024 | Sato et al. | |
| 2024/0253368 | A1 | 8/2024 | Sugimoto et al. | |

* cited by examiner

PRINTING APPARATUS, SHEET CONVEYING APPARATUS, AND SHEET TENSION ADJUSTMENT METHOD

BACKGROUND OF THE INVENTION

Field of the Invention

The present disclosure relates to a printing apparatus, a sheet conveying apparatus and a sheet tension adjustment method, and particularly relates to a technique for detecting the tension of a continuous sheet being conveyed.

Description of the Related Art

Continuous sheet conveyance may require appropriate tension settings for each section in which the sheet is conveyed. For example, in an apparatus for conveying a sheet as a printing medium, a printing unit applies high tension to the sheet in order to prevent the sheet from flapping. On the other hand, a sheet winding part applies low tension to the sheet in order to prevent damage to the winding core due to winding pressure. In this case, a configuration is required to set appropriate tension in each of a plurality of conveyance units. Japanese Patent Laid-Open No. 2014-522350 (hereinafter referred to as Document 1) discloses that a tension detection unit configured to detect tension is provided in each conveyance unit, thus setting an appropriate tension in each section using the tension detection unit for the section.

However, in a case where a tension detection unit is provided in each of a plurality of conveyance units as in the apparatus described in Document 1, problems may arise, for example, such as increases in cost and size of the apparatus.

SUMMARY OF THE INVENTION

A sheet conveying apparatus according to the present disclosure includes: a supply unit configured to supply a sheet; a first switching unit disposed on a conveyance path of the sheet and configured to switch between a state where the sheet supplied by the supply unit is nipped and a state where the nipping of the sheet is released; a first tension applying unit disposed on one side of the first switching unit in a conveyance direction of the conveyance path and configured to apply tension to the sheet; and a detection unit disposed on the other side of the first switching unit in the conveyance direction of the conveyance path and configured to detect the tension of the sheet, wherein, in a state where the nipping of the sheet is released by the first switching unit, the first tension applying unit adjusts the tension of the sheet while the detection unit detects the tension of the sheet.

Further features of the present invention will become apparent from the following description of exemplary embodiments with reference to the attached drawings.

DESCRIPTION OF THE EMBODIMENTS

Hereinafter, embodiments of the present invention will be described in detail with reference to the drawings.

(Printing Apparatus)

Figure 1:
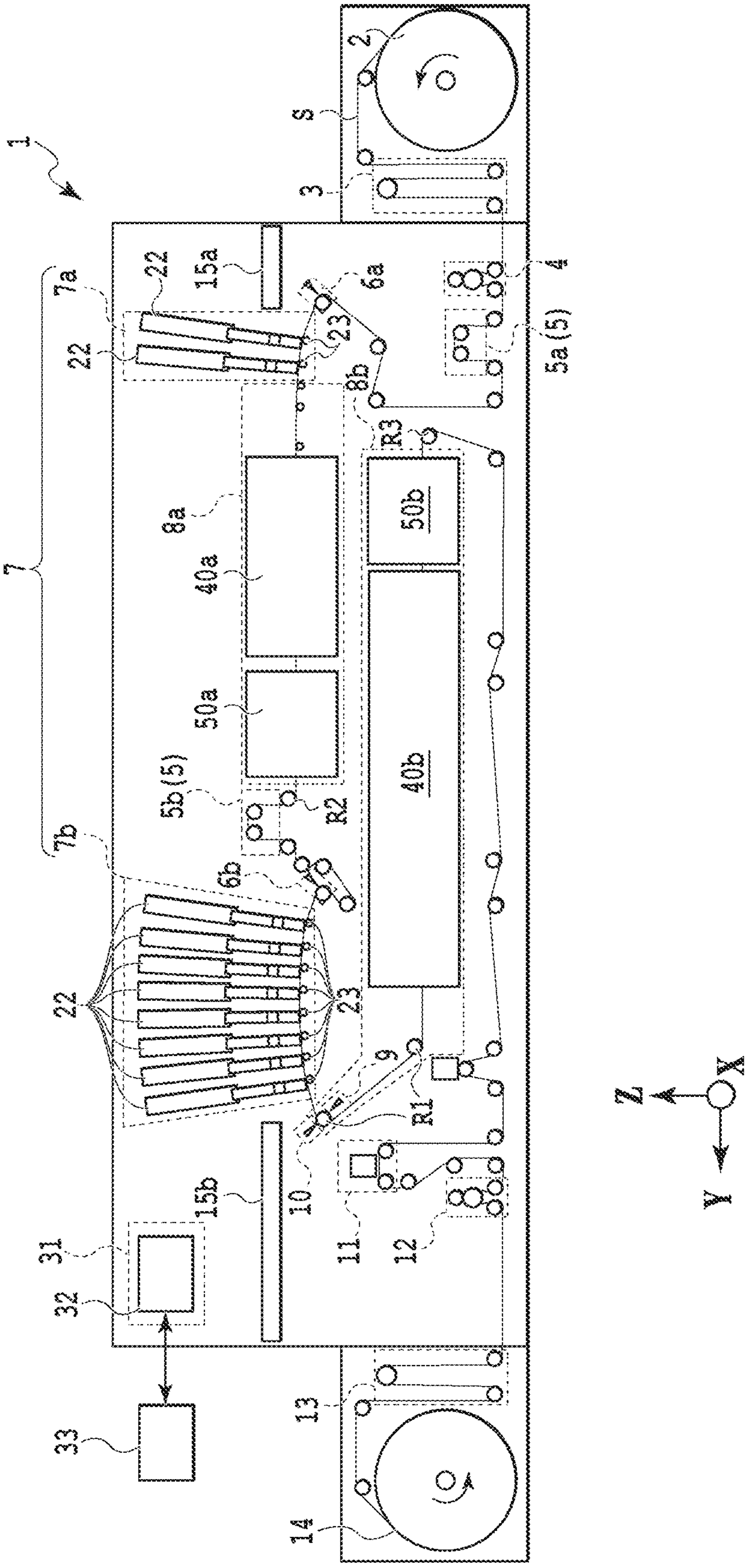
FIG. 1 is a schematic cross-sectional view of a printing apparatus according to the present disclosure.

FIG. 1 is a schematic side view of a printing apparatus 1 that constitutes a sheet conveying apparatus according to an embodiment of the present invention. In FIG. 1, the Z direction is toward the top side of the printing apparatus 1, the X direction is a width direction of a sheet S being conveyed, and the Y direction is the direction from the upstream side to the downstream side of sheet conveyance.

The printing apparatus 1 can use a rolled continuous sheet as a printing medium. The printing apparatus 1 includes, from the upstream side along a conveyance path of a sheet S, an unwinding roll unit 2, a first tension applying unit 3, a first main conveyance unit 4, a meandering correction unit 5*a*, a conveyance detection unit 6*a*, and a printing unit 7*a*. A drying unit 40*a* and a cooling unit 50*a* are also disposed on the downstream side of the printing unit 7*a*. A meandering correction unit 5*b*, a conveyance detection unit 6*b*, and a printing unit 7*b* are also disposed on the downstream side of the cooling unit 50*a*. On the downstream side of the printing unit 7*b*, the sheet S passes through a conveyance tension detection unit 9, a printed image position detection unit 10, a scanner unit 11, a second main conveyance unit 12, and a second tension applying unit 13 before reaching a winding roll unit 14.

The unwinding roll unit 2 holds the rolled sheet S and supplies the sheet S to the conveyance path according to a printing operation. The number of rolls that can be accommodated is not limited to one, but two, three or more rolls may be accommodated and configured to selectively supply the sheet S.

The first tension applying unit 3 is disposed between the unwinding roll unit 2 and the first main conveyance unit 4, and applies tension to the sheet S as described later with reference to FIGS. 4A and 4B. Similarly, the second tension applying unit 13 is disposed between the second main conveyance unit 12 and the winding roll unit 14, and applies tension to a predetermined sheet S.

The first main conveyance unit 4 and the second main conveyance unit 12 convey the sheet S to each of the units provided along the sheet conveyance path (sheet S). These main conveyance units 4 and 12 convey the sheet while applying tension to the sheet according to the tension set by the first and second tension applying units 3 and 13. That is, the first and second main conveyance units 4 and 12 each have rollers rotated by the driving force of a motor to convey the sheet S. Here, by controlling the rotation speed of the rollers, the tension is adjusted to the above set tension. Note that, as a configuration for adjusting the tension of the sheet S, a configuration may be added in which the tension of the sheet S is adjusted by a clutch (not shown) that is connected to be driven and can control torque. In this case, there are two tension control methods. One is a torque control method for controlling a torque value transmitted from the clutch. The other is a speed control method for controlling the roller speed of the second main conveyance unit 12. These two tension control methods can be switched therebetween or can be used both at the same time according to a purpose.

The meandering correction unit 5 is a unit for correcting meandering in the sheet width direction in a case where the sheet S is conveyed under tension. In this example, the meandering correction unit 5 includes a first meandering correction unit 5*a* and a second meandering correction unit 5*b*, which are provided upstream of each printing step on the sheet conveyance path.

The conveyance detection unit 6 is a unit for detecting the conveyance speed of the sheet S and marks previously printed on the sheet S, in order to control the image formation timing of the printing unit 7. In this example, the conveyance detection unit 6 includes a first conveyance detection unit 6*a* and a second conveyance detection unit 6*b*, which are provided upstream of each printing step on the sheet conveyance path.

The printing unit 7 is a sheet processing unit configured to form an image by applying a liquid composition onto the conveyed sheet S from above using a printing head 22. The conveyance path in the printing unit 7 is formed by guide rollers 23 arranged in an upward convex arc shape, and a clearance is secured with respect to the printing head 22 by applying a certain tension to the sheet S. In the printing head 22, a plurality of printing heads are arranged along the conveyance direction. In this example, the first printing unit 7*a* has a total of two line-type printing heads corresponding to white (W) ink and a reaction liquid. The second printing unit 7*b* has a total of eight line-type printing heads corresponding to four colors, black (Bk), yellow (Y), magenta (M), and cyan (C), as well as a reaction liquid and three special colors.

As will be described in detail later with reference to FIG. 9, the conveyance tension detection unit 9 detects the tension of the sheet S during conveyance of the sheet with the tension applied thereto between the first main conveyance unit 4 and the second main conveyance unit 12.

The printed image position detection unit 10 detects a shift in the image formed on the sheet S by the printing unit 7 during printing. A winding guide roller R1 is a roller for winding the surface of the sheet S downstream of the second printing unit 7*b*, which is opposite to the ink application surface, at a fixed winding angle. In this example, two winding guide rollers R1 are arranged between the second printing unit 7*b* and a second drying unit 40*b*. The sheet S is folded back approximately parallel between the top and bottom of the apparatus. The second drying unit 40*b* is disposed below the printing unit 7*b* in the apparatus.

The scanner unit 11 is a unit for making a correction for main printing by reading a test image formed on the sheet S by the printing unit 7 before the main printing and detecting image deviation and density.

A maintenance unit 15 is a unit including a mechanism for restoring ejection performance of the printing head 22. Examples of such a mechanism include a cap mechanism for protecting the ink ejection surface of the printing head 22, a wiper mechanism for wiping the ink ejection surface, and a suction mechanism for suctioning the ink inside the printing head 22 from the ink ejection surface under negative pressure. The maintenance unit also includes a drive mechanism and rails (not shown), and is capable of reciprocating horizontally along the rails. The maintenance unit moves to a position directly below the printing head during maintenance of the printing head and moves to a position retracted from directly below the printing head in a case where no maintenance operation is performed. In this example, a first maintenance unit 15*a* and a second maintenance unit 15*b* are provided for the first printing unit 7*a* and the second printing unit 7*b*, respectively.

The drying unit 40 (first drying unit 40*a* and second drying unit 40*b*) dries the ink applied onto the sheet S by the printing unit 7 to improve the fixability of the ink to the sheet S. The drying unit 40 dries the ink application surface of the sheet S by blowing air to the sheet S at least from the ink application surface side. The drying method may be configured by combining a method of irradiating the surface of the sheet S with electromagnetic waves (ultraviolet rays, infrared rays, or the like) and a method of conductive heat transfer through contact with a heating element, besides the method of blowing air. The cooling unit 50 (first cooling unit 50*a* and second cooling unit 50*b*) cools the sheet S fixed by the drying unit 40 to solidify the ink, and suppresses a temperature variation of the sheet S in the downstream process of the printing apparatus.

The cooling unit 50 cools the ink application surface of the sheet S by blowing air of a temperature lower than that of the sheet S at least from the ink application surface side to the sheet S. The cooling method is not limited to blowing air, but may be combined with a conductive heat transfer through contact with a cooling member. The winding roll unit 14 is a unit for winding the printed sheet S onto a winding core. The number of collectable rolls is not limited to one, but may have two, three or more winding cores, and the sheet S may be collected by selectively switching therebetween. Depending on the details of post-printing processing, the continuous sheet may be cut using a cutter, instead of winding the sheet around the winding core, and the cut sheets S may be stacked.

The control unit 31 is a unit configured to control the respective units in the entire printing apparatus. The control unit 31 includes a CPU, a storage unit, a controller including various control units, an external interface, and an operation unit 32 used by a user to perform input and output. The operation of the printing apparatus 1 is controlled based on instructions from the controller or a host apparatus 33 such as a host computer connected to the controller via an external interface.

The printing apparatus 1 having the configuration described above executes a first printing step and a second printing step, or selectively executes the first and second printing steps. In the first printing step, printing is performed on the sheet by the first printing unit 7*a* and the first conveyance path 8*a*. The first conveyance path 8*a* includes the first drying unit 40*a* and the first cooling unit 50*a*. In the second printing step, printing is performed on the sheet S by the first printing unit 7*b* and the second conveyance path 8*b*. The second conveyance path 8*b* includes the second drying unit 40*b* and the second cooling unit 50*b*.

Figure 2:
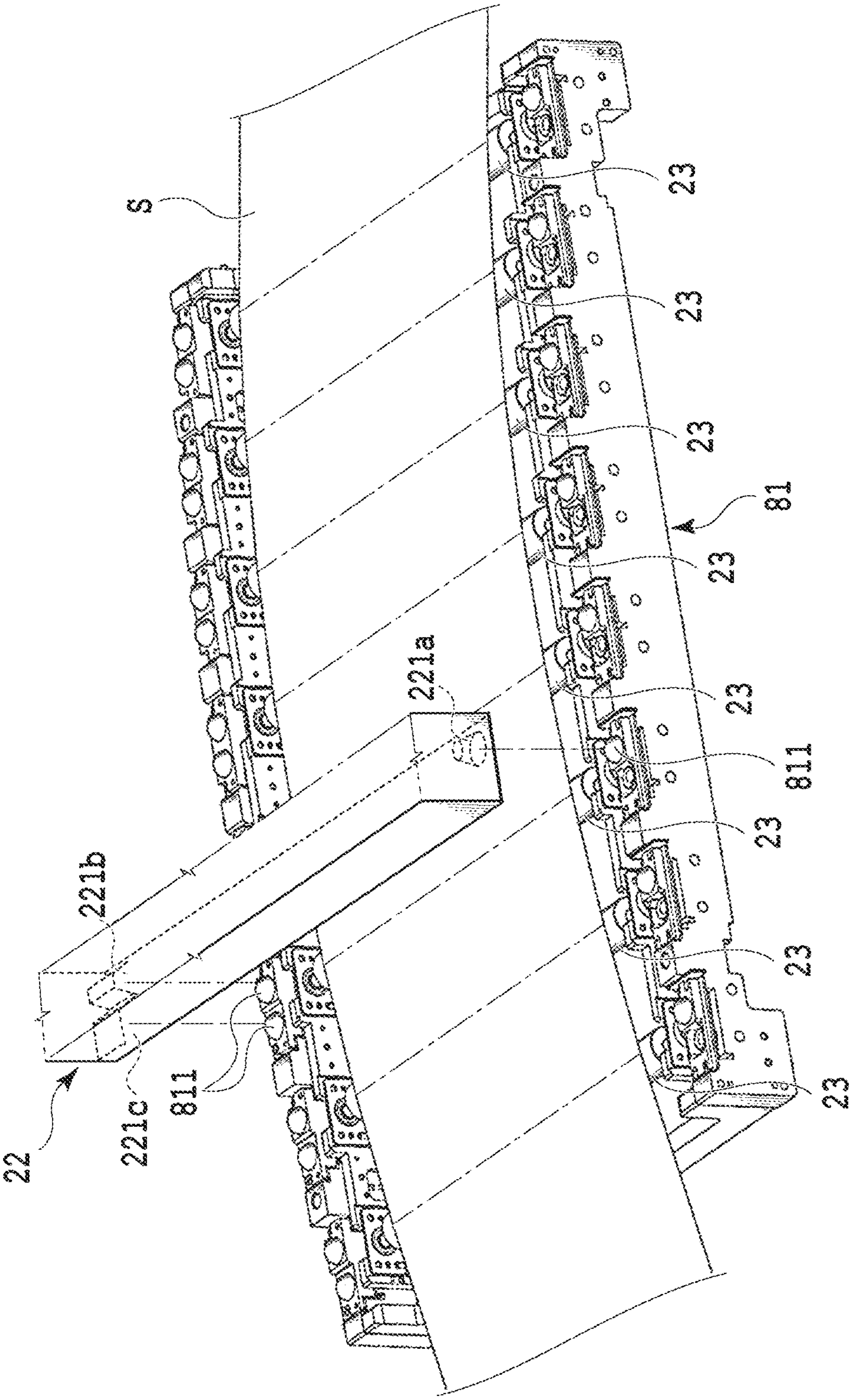
FIG. 2 is a perspective view of a sheet conveyance unit housing of a printing unit according to the present disclosure.

FIG. 2 is a perspective view of a sheet conveyance unit housing 81 of the printing unit 7. As shown in FIG. 2, the sheet conveyance unit housing 81 of the printing unit 7 has a plurality of printing head positioning members 811 for positioning the printing head 22. The plurality of printing head positioning members 811 are arranged in front and back in the sheet width direction across the sheet S, one in front and two in the back for each printing head 22.

Figure 3:
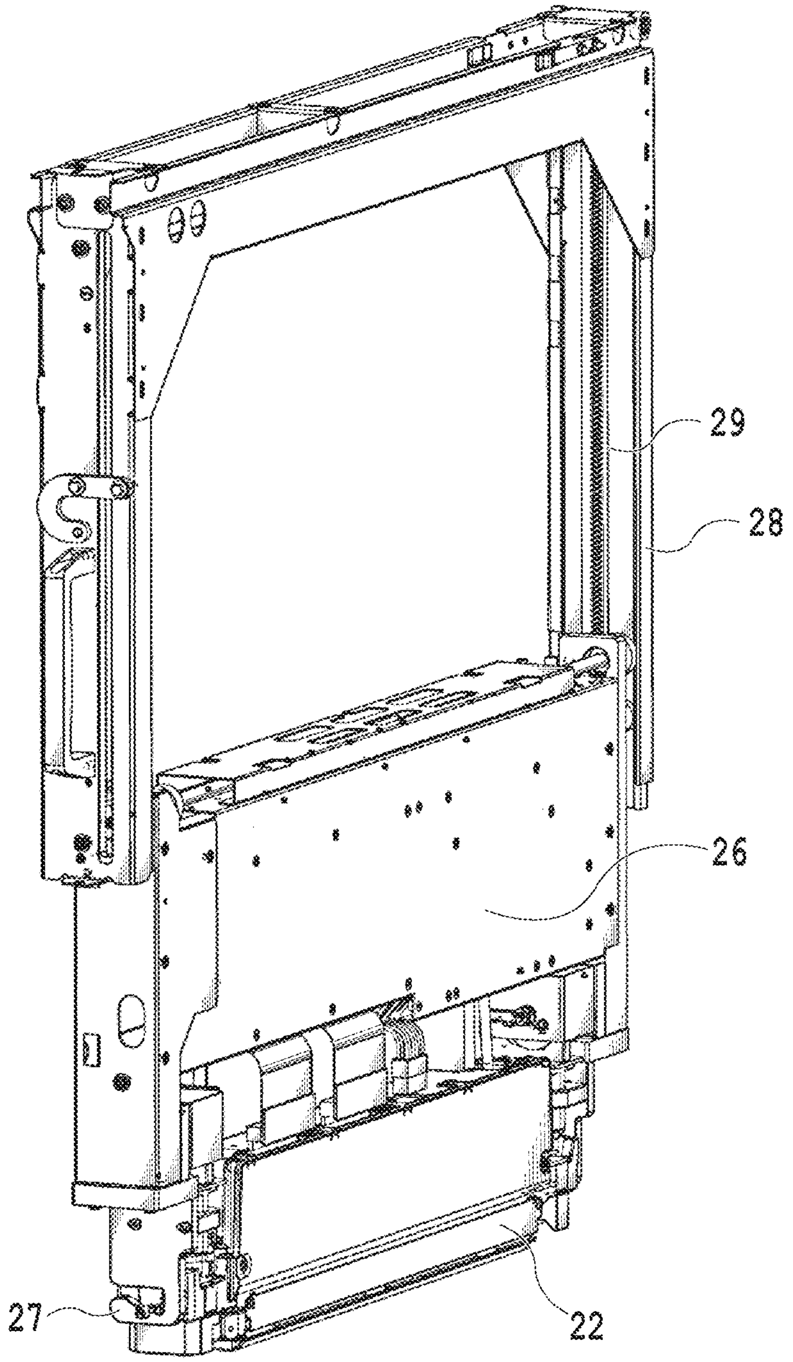
FIG. 3 is a perspective view of a printing head raise/lower mechanism according to the present disclosure.

FIG. 3 is a perspective view of a printing head raise/lower mechanism. As shown in FIG. 3, the printing head 22 is supported by a printing head holder 26 for holding and raising/lowering the printing head 22, so as to support a printing head supporting shaft 27 from below. The printing head holder 26 performs a raise/lower operation along raise/lower rails 29 provided in a printing head raise/lower frame 28 by a drive mechanism (not shown) provided therein. In this example, an inkjet head is used to apply the liquid composition onto the sheet S, but the method of applying the liquid composition onto the sheet by the printing unit 7 is not limited thereto. The printing head 22 can be moved by the printing head raise/lower mechanism between a printing position where printing is performed on the sheet S and a retracted position away from the sheet S.

(Tension Applying Unit)

Figure 4A:
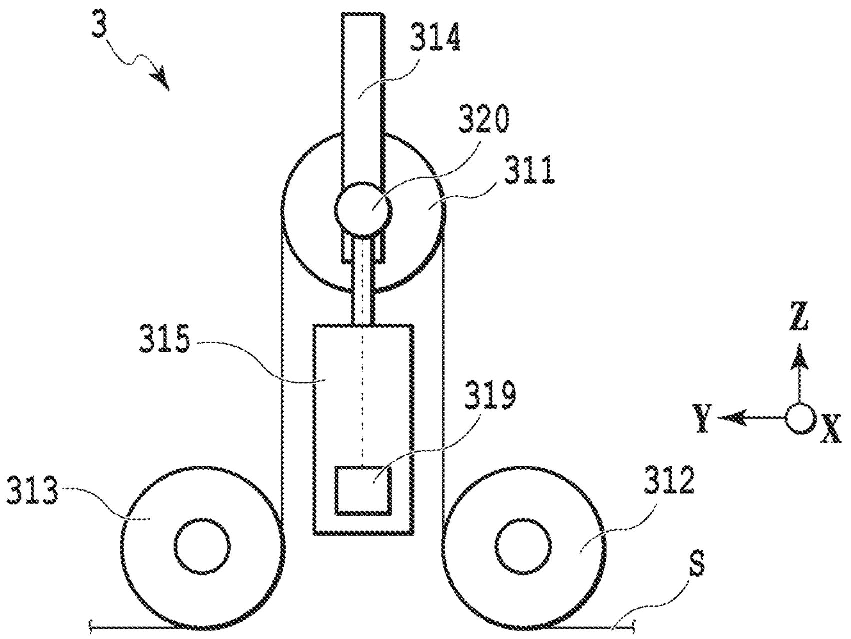
FIGS. 4A and 4B are schematic cross-sectional views of a tension applying unit according to the present disclosure.
Figure 4B:
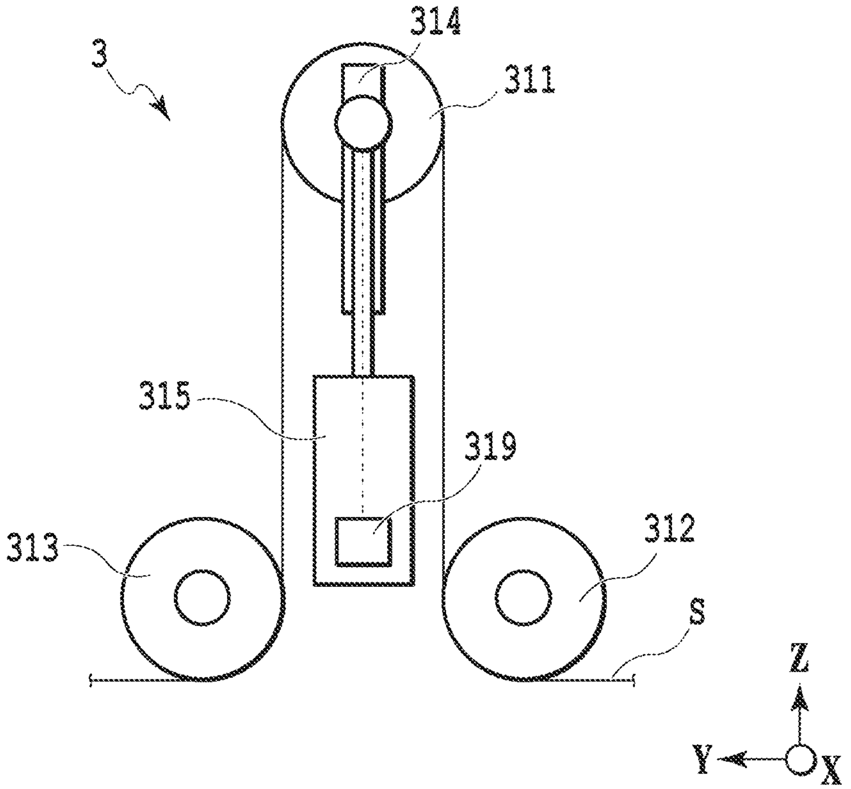
Figure 5:
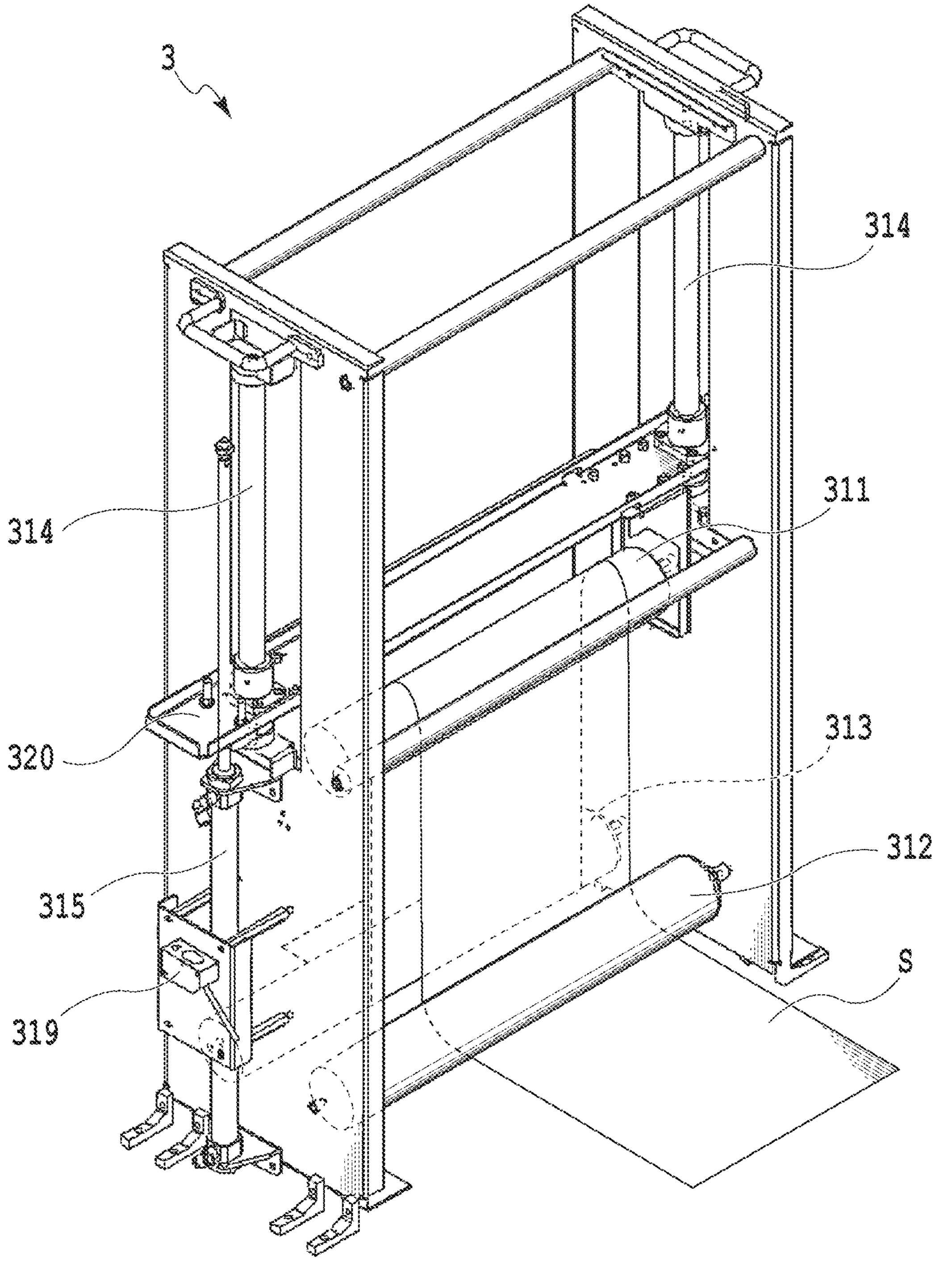
FIG. 5 is a perspective view of the tension applying unit according to the present disclosure.

FIGS. 4A and 4B are cross-sectional views showing a schematic configuration of the first tension applying unit 3. FIG. 5 is a perspective view showing the structure of the first tension applying unit 3. In the present embodiment, the second tension applying unit 13 disposed on the downstream side in the conveyance direction also has the same configuration as the first tension applying unit 3, and thus description thereof will be omitted in this specification. Note that the first tension applying unit and the second tension applying unit do not need to have the same configuration, and may have different configurations as long as the tension application described below is performed appropriately.

As shown in FIGS. 4 and 5, the first tension applying unit 3 of the present embodiment generally includes a moving roller 311, fixed rollers 312 and 313, and an air cylinder for moving the moving roller 311 in a vertical direction in FIGS. 4 and 5. The first tension applying unit 3 applies tension, corresponding to a vertical position of the moving roller 311, to the sheet S in a direction intersecting with the sheet S wound around each roller so as to pass above the moving roller 311 and below the fixed rollers 312 and 313. Specifically, the first tension applying unit 3 applies and sets tension to the sheet S by changing the total length of the sheet S conveyed between the unwinding roll unit 4 (FIG. 1) and the winding roll unit 14 (FIG. 1) according to the position of the moving roller 311. FIGS. 4A and 4B respectively show two positions of the moving roller 311 set as described above. During the conveyance of the sheet S, the tension set by the first tension applying unit 3 is maintained through the frictional force for sheet conveyance by conveyance rollers and nip rollers that separate the set conveyance section.

A holding member 320 configured to rotatably support the moving roller 311 is movably supported by two guide shafts 314 having both ends provided in parallel. An air cylinder 315 for applying a load is provided corresponding to each guide shaft 314. The holding member 320 is thus moved by the driving force of the air cylinder 315. Specifically, the moving roller 311 is moved by the pressure of compressed air flowing into the air cylinder 315, and the tension acting on the sheet S can be adjusted by the pressure of compressed air flowing into the air cylinder 315 so as to have an appropriate value according to the position of the moving roller.

Figure 6:
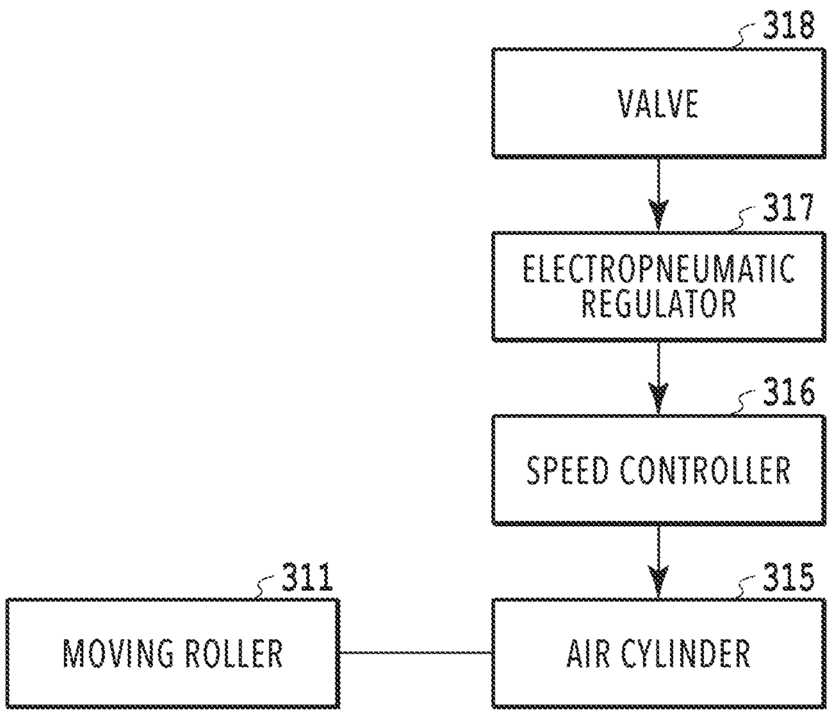
FIG. 6 is a schematic view of an air circuit in the tension applying unit according to the present disclosure.

FIG. 6 is a block diagram of an air circuit in the tension applying units 3 and 13. The air cylinder 315 is connected to a valve 318, into which compressed air flows, through a speed controller and an electropneumatic regulator 317. The pressure of the compressed air is adjusted by the electropneumatic regulator 317 adjusting the flow rate of the compressed air flowing in from the valve 318. A manual pressure change unit may be used, instead of the electropneumatic regulator 317, to adjust the flow rate of the compressed air. A position sensor 319 detects a moving amount of the moving roller 311 and outputs it as an output signal. A moving roller position control unit (not shown) detects the signal outputted from the position sensor 319 and performs feedback control so that the moving roller 311 remains at a fixed position within its movable range. The position of the moving roller 311 is adjusted by controlling output of a driving motor (not shown) connected to an unwinding roll unit (not shown) or a winding roll unit (not shown).

(Main Conveyance Unit)

Figure 7A:
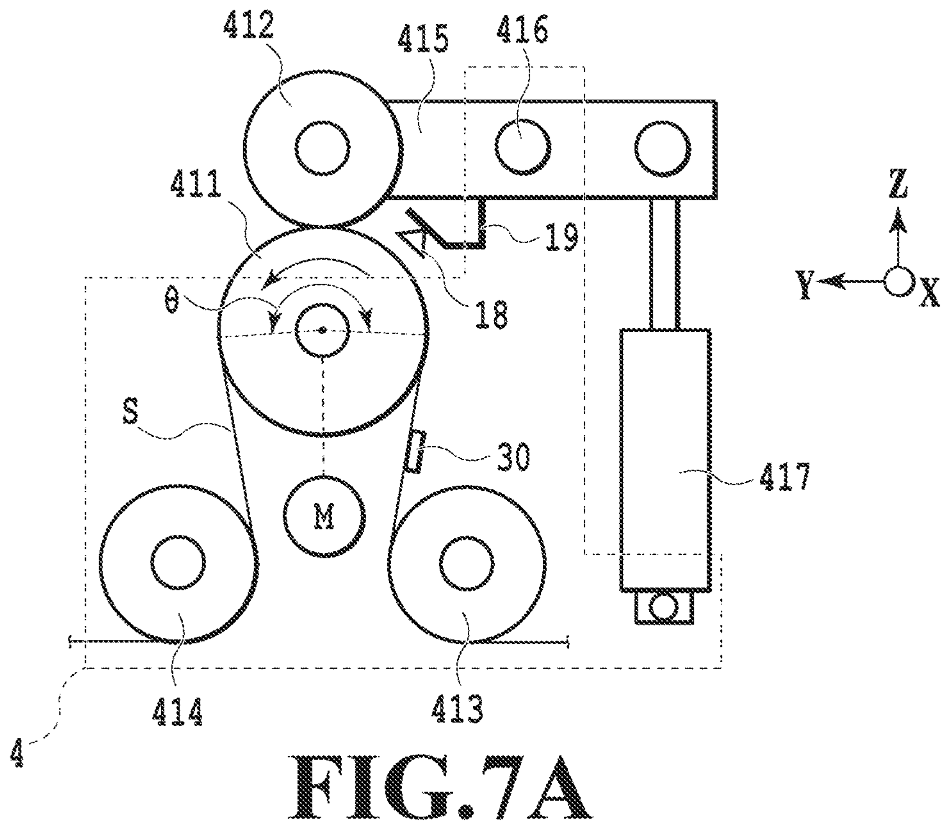
FIGS. 7A and 7B are schematic cross-sectional views of a first main conveyance unit according to the present disclosure.
Figure 7B:
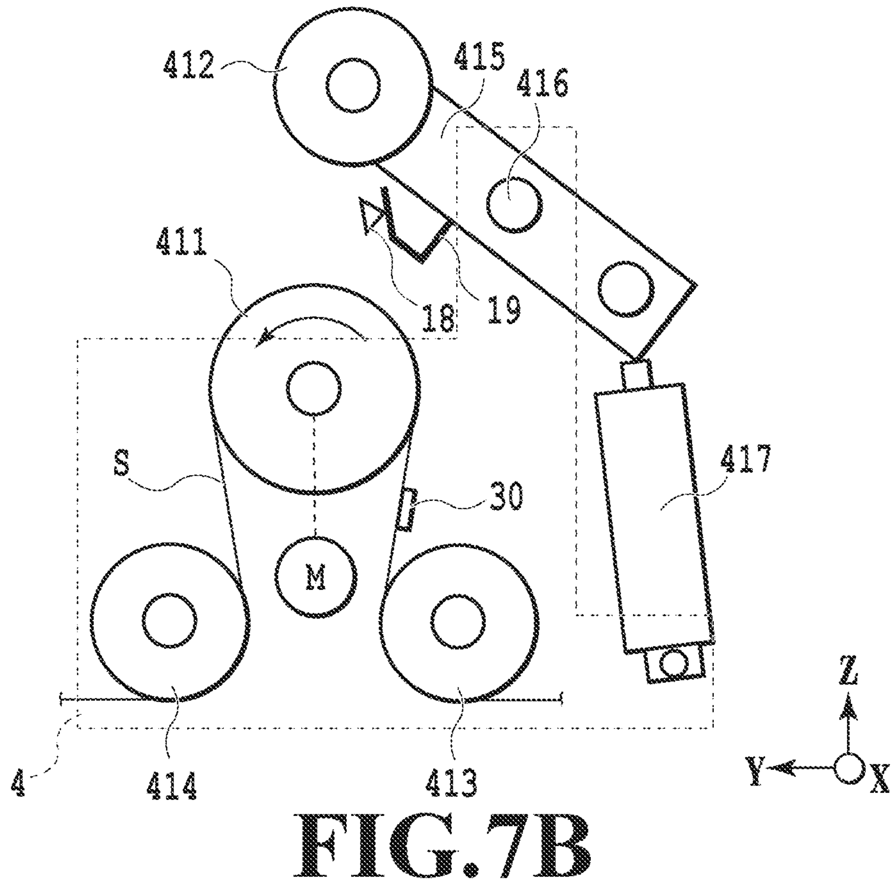

FIGS. 7A and 7B are diagrams showing a schematic configuration of the first main conveyance unit 4. FIG. 7A shows a state where a nip roller is pressed against a driving roller. FIG. 7B shows a state where the nip roller is separated from the driving roller. The second main conveyance unit 12 of the present embodiment has the same configuration as the first main conveyance unit 4, and thus description of the same configuration will be omitted.

The first main conveyance unit 4 includes a first driving roller 411 for conveying the sheet S, a first nip roller 412 disposed facing the first driving roller 411, and driven rollers (413 and 414). The second main conveyance unit 12 also includes a second driving roller 1211 for conveying the sheet S, a second nip roller 1212 disposed facing the second driving roller 1211, and driven rollers (413 and 414). In the state shown in FIG. 7A, the nip roller 412 is at a first position, that is, a position where it presses the first driving roller 411. At this first position, the nip roller 412 nips the sheet with the first driving roller 411, generating frictional force between the first driving roller 411 and the sheet S. This allows the first driving roller 411 to rotate and convey the sheet S. In the state shown in FIG. 7B, the nip roller 412 is at a second position, that is, a position away from the first driving roller 411. At this position, the nip roller 412 and the first driving roller 411 do not nip the sheet, but release the sheet. That is, the first main conveyance unit 4 is a switching unit configured to switch between a state of nipping the sheet S and a state of releasing the nipping of the sheet S.

The nip roller 412 is rotatably supported by a nip roller supporting unit 415. The nip roller supporting unit 415 is rotatable around a supporting rotation shaft 416, and moves the nip roller 412 between the first position described above and the second position also described above. A position switching drive unit 417 is connected to the nip roller supporting unit 415, swings the nip roller supporting unit 415, and drives the nip roller 412 to press it against the driving roller 411. An air cylinder, a spring member, a robot cylinder, or the like may be used as the position switching drive unit 417.

The first driven roller 413 and the second driven roller 414 form a conveyance path so that the sheet S is wrapped around the driving roller 411 at a predetermined wrap angle θ. The wrap angle θ refers to an angle at which the sheet S is in contact with the roller. In the present embodiment, the wrap angle θ of the driving roller 411 is about 180°. This wrap angle θ can be set to a predetermined value depending on the apparatus specifications. By bringing the sheet S into contact with the driving roller 411 at the wrap angle θ, the conveying force of the driving roller 411 conveying the sheet S increases. Specifically, the larger the wrap angle, the greater the frictional force that constitutes the conveying force.

The pressure contact of the sheet S against the driving roller by the nip rollers of the first and second main conveyance units described above makes it possible to maintain the tension set for each of adjacent conveyance sections without affecting each other (to define a conveyance section), as will be described in detail later with reference to FIG. 11 and the like. On the other hand, separating the nip roller from the driving roller allows tension transmission. In this respect, the pair of the drive roller and nip roller in the conveyance path also constitutes the boundary between adjacent conveyance sections. Such tension transmission control is performed based on the positional relationship between the nip roller and the driving roller.

Figure 8:
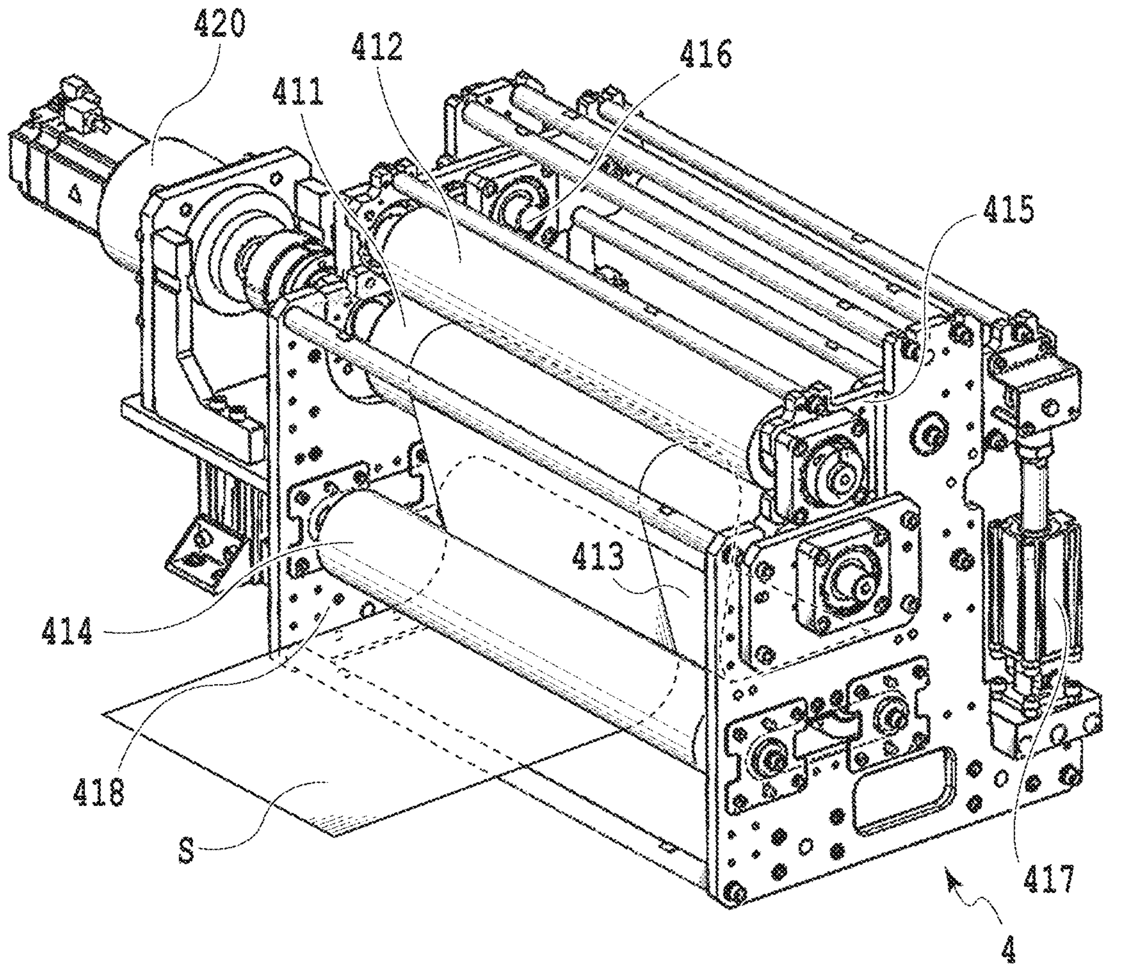
FIG. 8 is a perspective view of the first main conveyance unit according to the present disclosure.

FIG. 8 is a perspective view of the first main conveyance unit 4. The driving roller 411, the first driven roller 413, and the second driven roller 414 are rotatably held on the conveyance unit frame 418. Each roller may be supported by a bearing unit or the like directly on the conveyance unit frame 418, or may be held with an intermediate part interposed therebetween to facilitate roller replacement operation. The first main conveyance unit 4 and the second main conveyance unit 12 may have different configurations. There may be provided one or three or more conveyance units.

(Tension Detection Unit)

Figure 9:
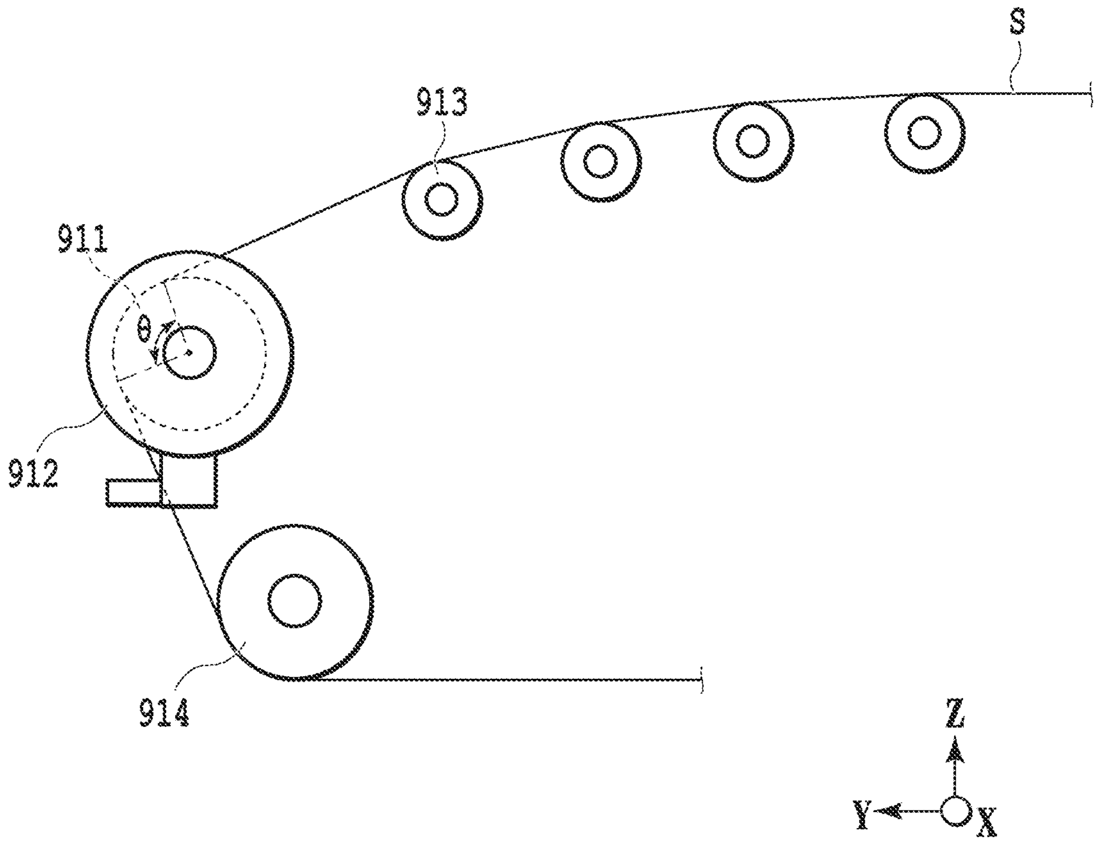
FIG. 9 is a schematic cross-sectional view of a tension detection unit according to the present disclosure.

FIG. 9 is a schematic cross-sectional view of the tension detection unit 9. The tension detection unit 9 includes a tension detection roller 911, a first driven roller 913, a second driven roller 914, and side plates 915 (see FIG. 10). The tension detection roller 911 is rotatably supported by a load cell 912 attached to the side plates 915. The tension detection roller 911 contacts the sheet S to measure the tension of the sheet S. The first driven roller 913 and the second driven roller 914 form a conveyance path so that the sheet is wrapped around the tension detection roller 911 at a wrap angle θ of 90°. The wrap angle θ may be set to 90° or any value. Upon calculation of the tension, the wrap angle θ of the tension detection roller 911 is taken into consideration to calculate the tension.

Figure 10:
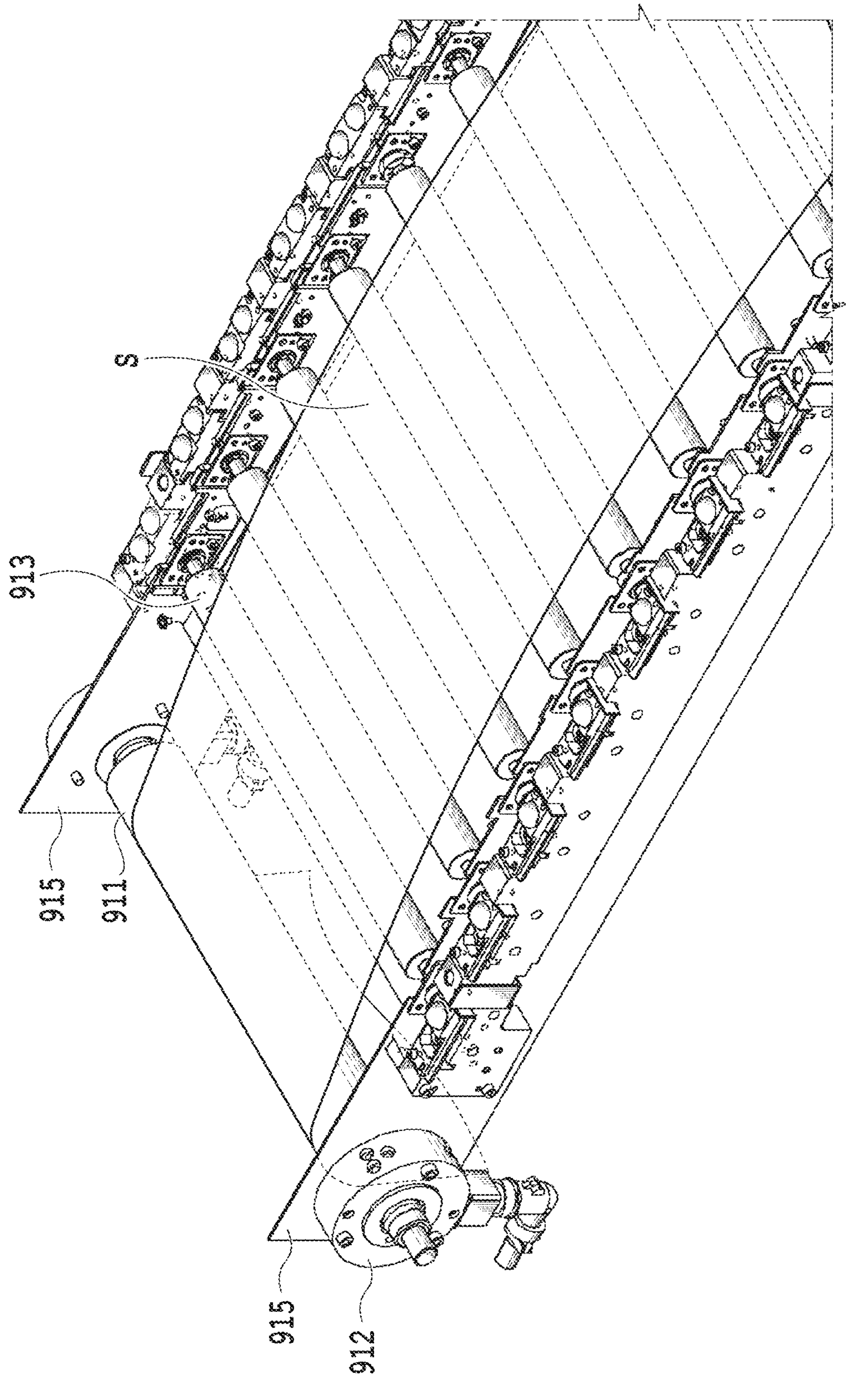
FIG. 10 is a perspective view of the tension detection unit according to the present disclosure.

FIG. 10 is a perspective view of the tension detection unit 9. The load cell 912 includes a pressure sensitive element (not shown) to detect the tension of the sheet S. The tension of the sheet S is transmitted to the tension detection roller 911. The load cell 912 detects the tension transmitted to the tension detection roller 911. The load cell 912 is provided at both ends or one end of the tension detection roller 911. The tension is calculated from the detected value using the sum of output values of the left and right load cells 912, the output value of a single load cell 912, or the average value of the output values of a plurality of load cells 912. The tension detection unit can detect and calculate the torque applied to the shaft of the roller on the conveyance path and the diameter of the roller.

(Tension Detecting Step Sequence)

Figure 11:
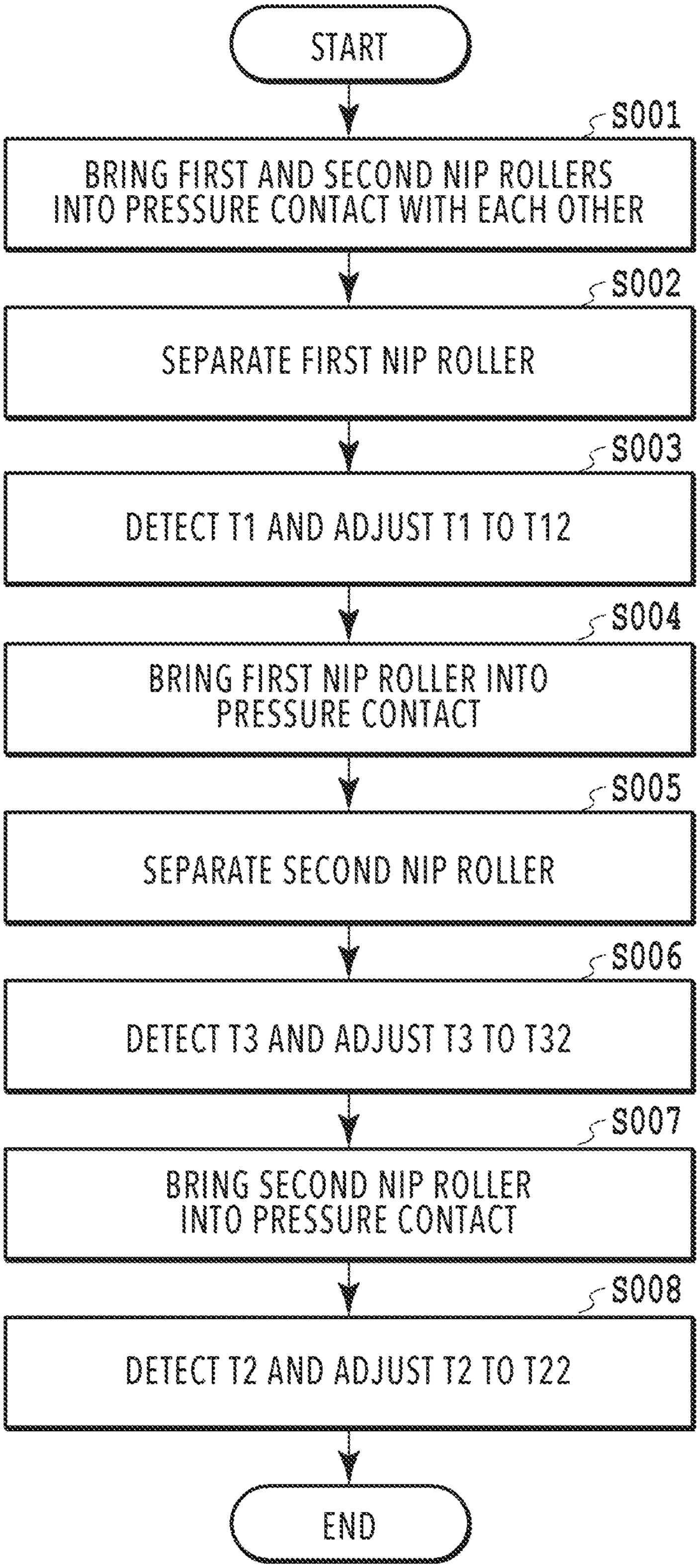
FIG. 11 is a flowchart of a tension detecting step according to the present disclosure.

FIG. 11 is a flowchart showing a sequence operation of a tension detecting step. FIG. 12A to 12D are schematic diagrams of a configuration for implementing the sequence operation of the tension detecting step shown in FIG. 11.

Figure 12A:
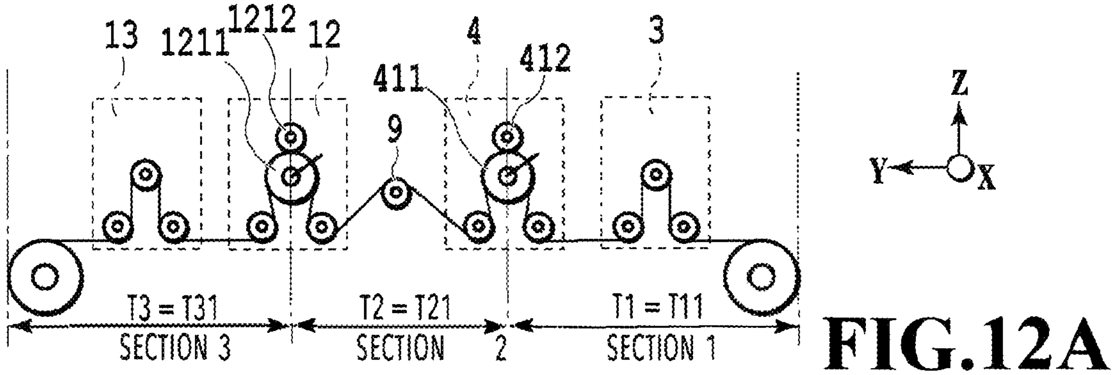
FIG. 12A to 12D are schematic views showing the tension detecting step according to the present disclosure.

In step S001 of FIG. 11, the first nip roller 412 of the first main conveyance unit 4 and the second nip roller 1212 of the second main conveyance unit 12 are set at the first position as shown in FIG. 12A. Specifically, the nip rollers 412 and 1212 are brought into pressure contact with the sheet S to press the sheet S against the corresponding driving rollers 411 and 1211 (hereinafter also referred to as a "nipped" state). This defines on the conveyance path a conveyance section (hereinafter also simply referred to as "section") 3 in the Y direction from the first main conveyance unit 4, a section 2 between the first main conveyance unit 4 and the second main conveyance unit 12, and a section 1 in the negative Y direction of the second main conveyance unit 12. In this state, the tension in each of the sections 1 to 3 is in a shut-off state of being unaffected by the tension in the adjacent section. Here, the tensions in the sections 1, 2, and 3 are expressed as T1, T2, and T3, respectively. The tensions T1, T2, and T3 have values T11, T21, and T31, respectively. In this event, the tension detection unit 9 provided between the first main conveyance unit 4 and the second main conveyance unit 12 can measure the tension value T21, but cannot measure the tension values T11 and T31.

Figure 12B:
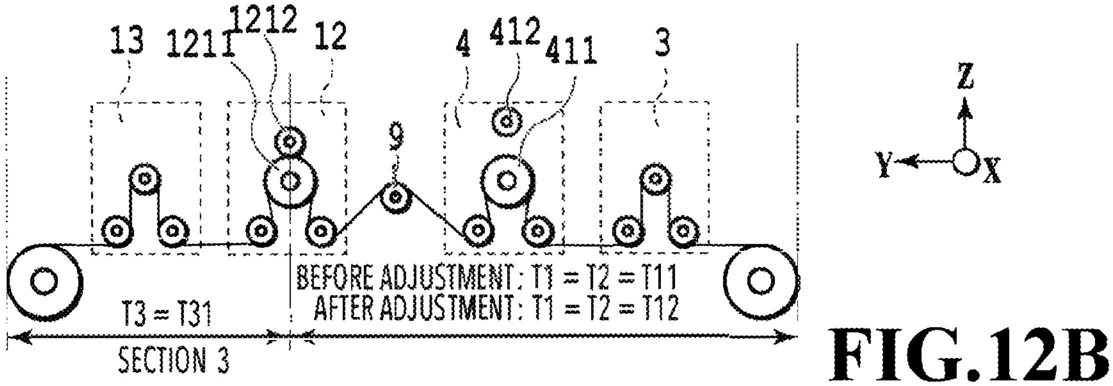

In step S002 of FIG. 11, as shown in FIG. 12B, the first drive roller 411 of the first main conveyance unit 4 is set in the second position while maintaining the nipped state of the sheet S by the second main conveyance unit 12, and the sheet S is released from the nipped state. If there is a difference between the values of the tensions T1 and T2 in this state, the sheet S slips and the two tension values become equal. In this case, the value T11 of the tension T1 does not change because the tension is applied by the tension applying unit 3 present in the same section. On the other hand, the tension value of the tension T2 becomes equal to the value T11 of the tension T1 due to slipping of the sheet S. The above behavior causes the tensions T1 and T2 to have the same tension value T11. As a mechanism for obtaining the same tension value, the excitation of a driving motor (not shown) connected to the first driving roller 411 may be shut off, instead of using the slipping between the first driving roller 411 and the sheet S. Specifically, shutting off the excitation of the driving motor may free the rotation of the driving roller, and the driving roller may be driven as the sheet S moves.

In step S003 of FIG. 11, the tension detection unit 9 detects the value T11 of the tension T1 and the tension T2 in the state shown in FIG. 12B. Then, referring to the detected value T11, the first tension applying unit 3 is driven to adjust the tension to a preset tension value T12. This causes the tensions T1 and T2 to have the value T12.

The preset tension value T12 may be determined depending on the sheet processing content, such as applying high tension to the sheet, or the material and width of the sheet, and the like, to prevent the sheet from flapping in the printing unit, for example.

In step S004 of FIG. 11, the first nip roller 412 of the first main conveyance unit 4 is set in the first position to set the sheet S in the nipped state, and then the first main conveyance unit 4 shuts off again the mutual influence between the tension T1 in the section 1 and the tension T2 in the section 2.

Figure 12C:
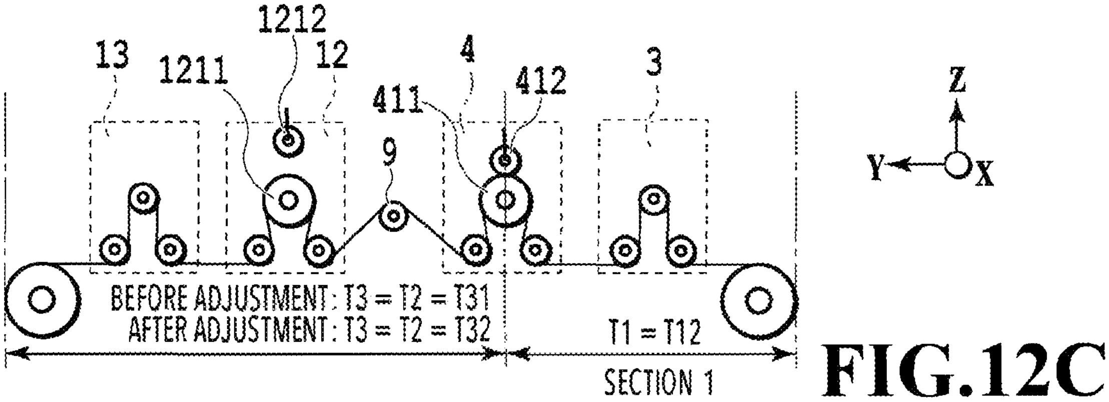

In step S005 of FIG. 11, as shown in FIG. 12C, while maintaining the nipped state of the sheet S by the first main conveyance unit 4, the second driving roller 1211 of the second main conveyance unit 12 is set in the second position to release the sheet S. Here, if there is a difference between the values of the tension T3 and the tension T2, the sheet S slips. In this event, the value T31 of the tension T3 does not change. On the other hand, the tension value of the tension T2 changes to a tension value T31 as the sheet S slips. The above operation causes the tension T3 and the tension T2 to have the same value T31.

In step S006 of FIG. 11, the tension detection unit 9 detects the value T31 of the tension T2 and the tension T3. The detected value drives the second tension applying unit 13 to make an adjustment to a tension value T32 based on the preset tension value T32. The tensions T2 and T3 thus have the value T32.

Figure 12D:
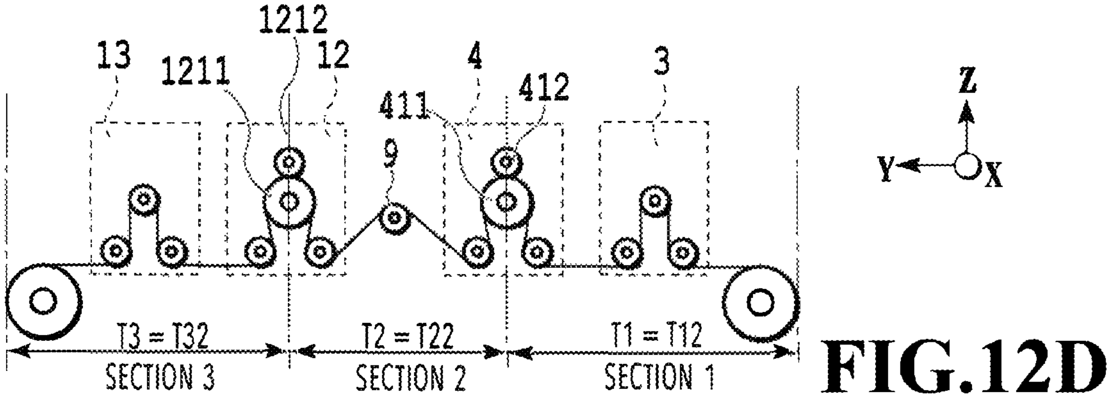

In step S007 of FIG. 11, as shown in FIG. 12D, the first nip roller 1212 of the first main conveyance unit 12 is set in the first position to set the sheet S in the nipped state, and the first main conveyance unit 12 shuts off again the mutual influence between the tension T2 and the tension T3.

In step S008 of FIG. 11, the value of the tension T2 is detected. The detected value is based on a preset tension value T22, and the first main conveyance unit 4 or the second main conveyance unit 12 applies tension to the sheet S, thus adjusting the tension value of the tension T2 to the tension value T22. Even if the tension value T22 is adjusted, the tension values T12 and T32 do not change because they are determined by the biasing tensions of the first and second tension applying units and are kept constant. By performing the above sequence, the tensions T1, T2, and T3 in the plurality of sections 1, 2, and 3 can be set to appropriate values T12, T22, and T32 using one tension detection unit 9.

(Modification of Tension Detecting Step Sequence)

Figure 13A:
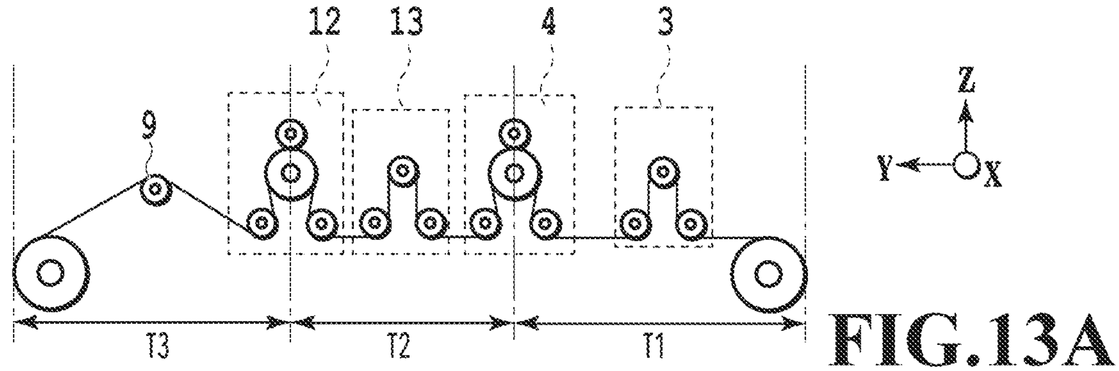
FIG. 13A to 13D are schematic views showing a modification of the tension detecting step according to the present disclosure.
Figure 13B:
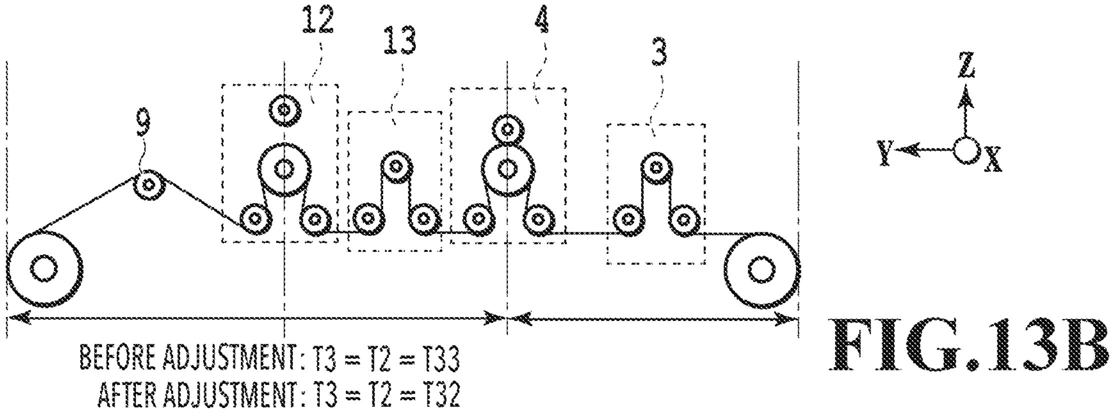

FIG. 13A to 13D are schematic diagrams of a sequence operation of a tension detecting step in a case where the tension detection unit 9 is disposed in the section located at the end. The tension is detected in the order of FIGS. 13A, 13B, 13C, and 13D. As shown in FIG. 13A, the sheet is delimited into sections 1, 2, and 3 by the conveyance units 4 and 12, and the tension detection unit 9 is disposed in the section 3. As shown in FIG. 13B, the nip roller 1212 of the second conveyance unit 12 is separated from the conveyance roller 1211, and the tensions T2 and T3 in the section 2 and 3 have the same value T32. The tension between the sections 2 and 3 is detected by the tension detection unit 9 and compared with a tension value T33, and the tensions T2 and T3 are adjusted to the tension T33.

Figure 13C:
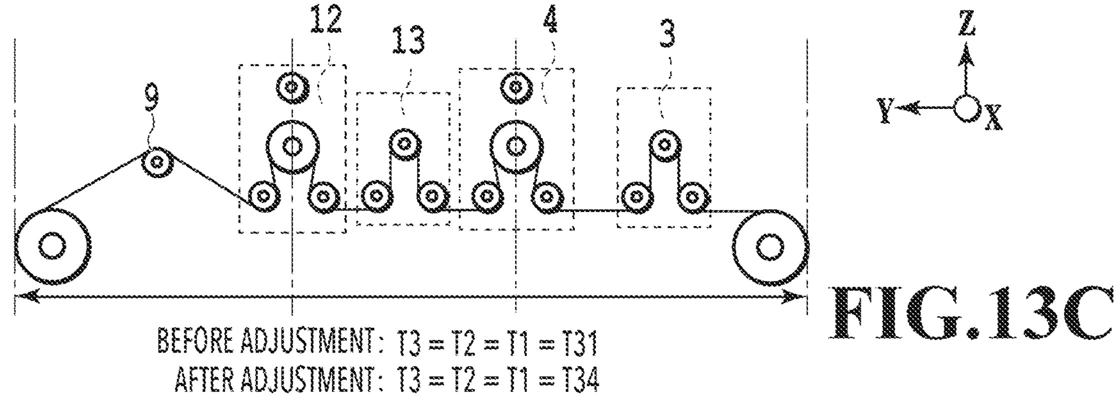

As shown in FIG. 13C, the nip roller 412 of the first conveyance unit 4 is separated from the conveyance roller 411, and the tensions T1, T2, and T3 in the sections 1 to 3 have the same value T31. The tension T31 across the sections 1 to 3 is detected by the tension detection unit 9 and compared with a tension value T34, and the tensions T2 and T3 are adjusted to T34.

Figure 13D:
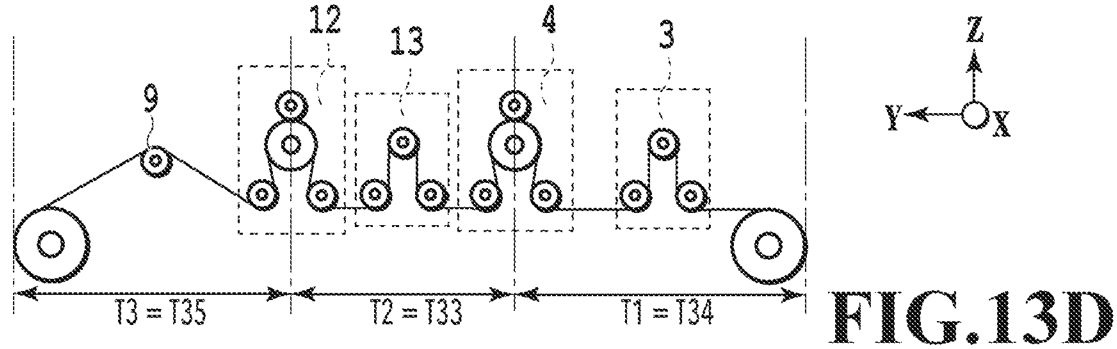

As shown in FIG. 13D, the first and second conveyance units 4 and 12 nip the sheet, and the tension in the section 3 is detected by the tension detection unit 9, compared with a tension value T35, and adjusted to the tension T35. Even if the tension detection unit 9 is thus disposed in a section located at the end, the tension in a plurality of sections can be adjusted by the tension detection unit 9. Although the tension detection unit 9 may be disposed outside the sections of the sheet, the tension in the sections of the sheet can be adjusted by the method described above.

Figure 14:
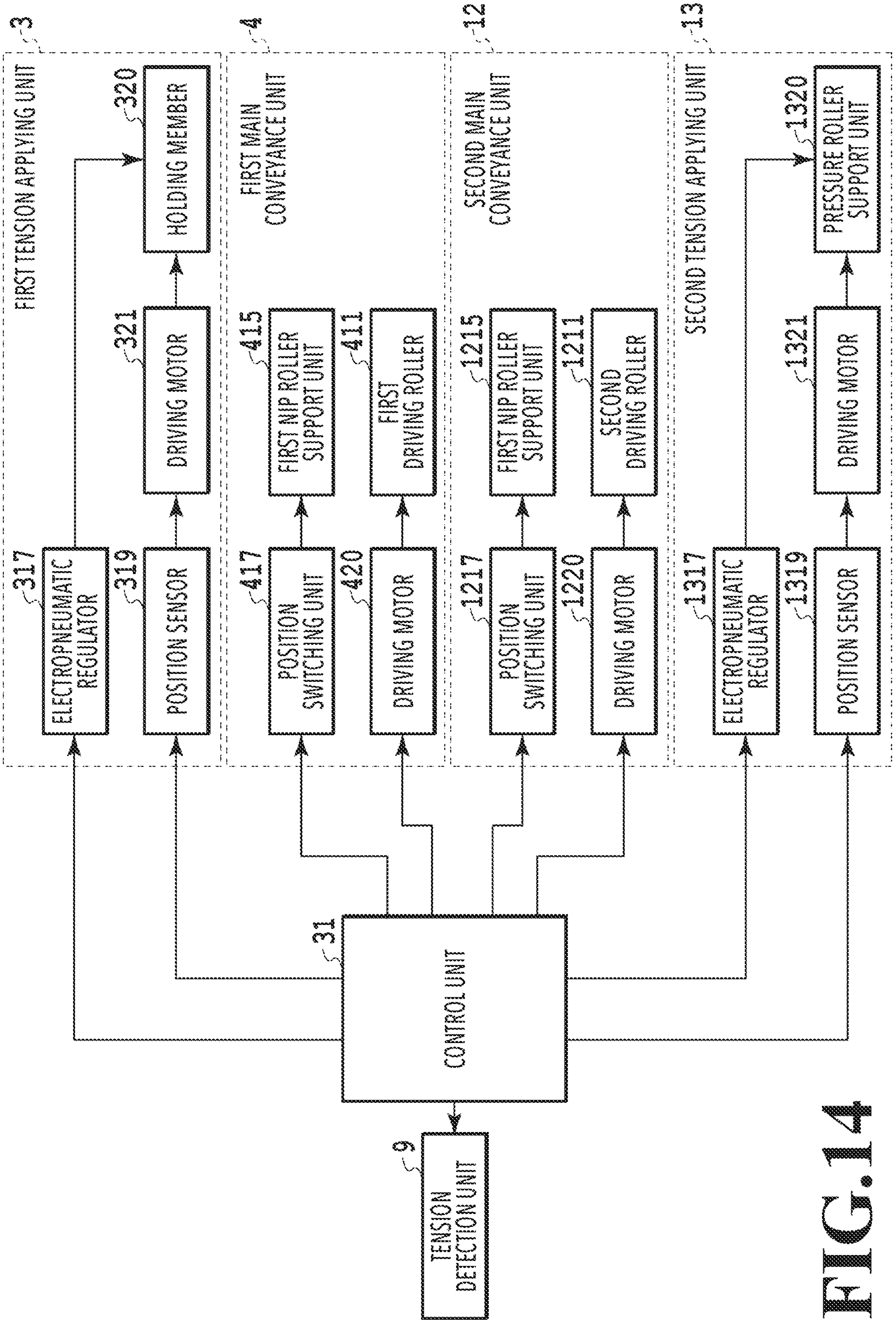
FIG. 14 is a block diagram of the tension detecting step according to the present disclosure.

FIG. 14 is a block diagram showing a configuration for implementing the tension detecting step. The control unit 31 detects the tension detected by the tension detection unit 9 and controls the first and second tension applying units 3 and 13 and the first and second main conveyance units 4 and 12.

Note that, as is clear from the embodiment of the tension detecting step sequence and the modification thereof described above, even if there are two sections, the tension detecting step sequence can be implemented in the same manner. In a case where two sections are defined in the sheet by one conveyance unit, the tension applying unit is disposed on one side, and the tension detection unit 9 is disposed in a section on the other side, the value detected by the tension detection unit is the total value of tensions in two sections. By comparing the tension value in each section with the corresponding tension value, the tension can be detected even in a section where there is no tension detection unit.

Even if there are four or more sections, the tension detecting step sequence can be performed in the same manner. In a case where four or more sections are defined in the sheet by a plurality of conveyance units and the tension detection unit 9 is disposed in any of the sections, the value detected by the tension detection unit is the total value of tensions in the four or more sections. By comparing the tension value in each section with the corresponding tension value, the tension can be detected even in a section where there is no tension detection unit.

(Slack Removal Step Performed Before Sequence Operation)

Figure 15:
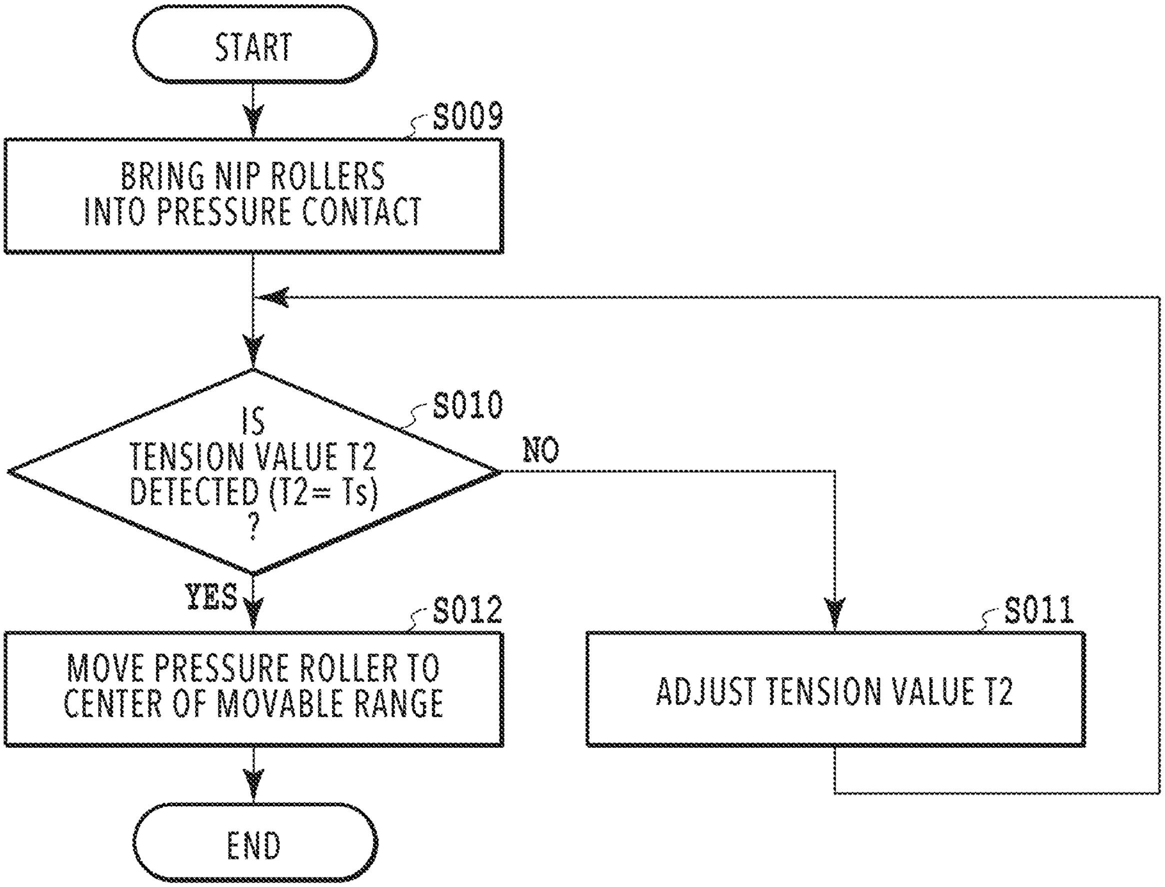
FIG. 15 is a flowchart of a slack removal step according to the present disclosure.

The following slack removal step is performed before the tension detecting step. FIG. 15 is a flowchart showing a slack removal step sequence. In step S009, the first and second conveyance units nip the sheet and define three sections as in FIG. 12A to 12D. In step S010, a tension value in a section 2 between the first main conveyance unit 4 and the second main conveyance unit 12 is detected.

If the tension value is different from the tension value, the first main conveyance unit 4 or the second main conveyance unit 12 is driven in step S011 to adjust the tension in the section 2 to the tension value. The tension value is equal to the tension value set in the section 1 and the section 3 by the first and second tension applying units 3 and 13. In step S010, the tension value in the section 2 between the first main conveyance unit 4 and the second main conveyance unit 12 is detected. If the tension value in the section 2 is equal to the tension value, the positions of the first and second moving rollers 311 and 1311 of the first and second tension applying units 3 and 13 are driven to the center position within the movable range along the Z direction in step S012.

The slack of the sheet in the section 2 between the first main conveyance unit 4 and the second main conveyance unit 12 can be adjusted in advance. By driving the positions of the moving rollers 311 and 1311 to the center of the movable range while avoiding top and bottom dead centers, the tension applying units 3 and 13 can increase or decrease the tension.

(Overall Sequence Operation During Printing)

Figure 16:
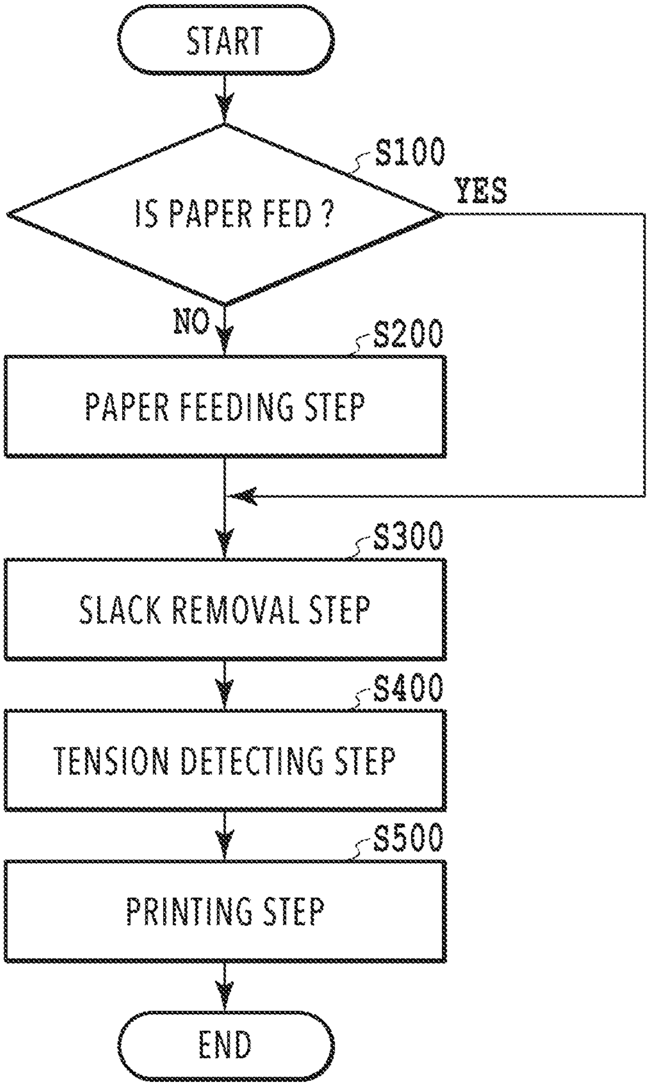
FIG. 16 is a flowchart of an overall sequence operation according to the present disclosure.

FIG. 16 is a flowchart showing an overall sequence operation during printing. In step S100, it is checked if the sheet S is fed through the apparatus conveyance path. This checking can be automatically carried out by driving the driving motors 420 and 1220 and observing a change in the value detected by the tension detection unit 9. If there is no sheet S on the apparatus conveyance path, a paper feeding step S200 is performed. Next, a slack removal step S300 is performed to eliminate the slack of the sheet S in the conveyance path. Then, a tension detecting step S400 is performed to set appropriate tension values in a plurality of sections. After the above steps are completed, a printing step is performed on the sheet in a printing step S500. In the steps S200 to S400, the printing head 22 moves to a retracted position. In the step S500, the printing head 22 moves to a printing position.

In a case of printing on a label sheet having a base material laminated on a release paper, a glue is applied to the interface between the release paper and the base material to impart adhesiveness to the base material. If excessive tension is applied to the label sheet during conveyance, the glue may run over the sides of the base material and release paper. By performing the tension detection operation sequence of the present invention, it is possible to set an appropriate tension value with a small number of tension detection units, thereby suppressing problems during conveyance of the label sheet.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2023-074659, filed Apr. 28, 2023, which is hereby incorporated by reference herein in its entirety.

What is claimed is:

1. A printing apparatus comprising:
a printing unit configured to perform printing on a sheet;
a supply unit configured to supply the sheet to the printing unit;
a first switching unit disposed on a conveyance path of the sheet and configured to switch between a state where the sheet supplied by the supply unit is nipped and a state where the nipping of the sheet is released;
a first tension applying unit disposed on one side of the first switching unit in a conveyance direction of the conveyance path and configured to apply tension to the sheet; and
a detection unit disposed on the other side of the first switching unit in the conveyance direction of the conveyance path and configured to detect the tension of the sheet, wherein
in a state where the nipping of the sheet is released by the first switching unit, the first tension applying unit adjusts the tension of the sheet while the detection unit detects the tension of the sheet.

2. The printing apparatus according to claim 1, wherein
the first tension applying unit is disposed upstream of the first switching unit with respect to the conveyance direction, and
the sheet conveying apparatus further comprises:
a second switching unit configured to switch between a state of nipping the sheet and a state of releasing the nipping of the sheet on the downstream side of the first switching unit in the conveyance direction; and
a second tension applying unit configured to apply tension to the sheet on the downstream side of the second switching unit in the conveyance direction.

3. The printing apparatus according to claim 2, wherein
after the tension of the sheet is adjusted by the first tension applying unit while the tension of the sheet is detected by the detection unit in a state where the nipping of the sheet is released by the first switching unit and the sheet is nipped by the second switching unit, the tension of the sheet is adjusted by the second tension applying unit while the tension of the sheet is detected by the detection unit in a state where the sheet is nipped by the first switching unit and the nipping of the sheet is released by the second switching unit.

4. The printing apparatus according to claim 2, wherein
after the tension of the sheet is adjusted by the second tension applying unit while the tension of the sheet is detected by the detection unit in a state where the sheet is nipped by the first switching unit and the nipping of the sheet is released by the second switching unit, the tension of the sheet is adjusted by the first tension applying unit while the tension of the sheet is detected by the detection unit in a state where the nipping of the sheet is released by the first switching unit and the sheet is nipped by the second switching unit.

5. The printing apparatus according to claim 2, wherein the detection unit is located between the first switching unit and the second switching unit in the conveyance direction.

6. The printing apparatus according to claim 2, further comprising:
a winding unit configured to wind the sheet downstream of the second tension applying unit in the conveyance direction.

7. The printing apparatus according to claim 1, wherein
the tension applying unit includes
a moving roller configured to press the sheet; and
a load applying unit configured to drive the moving roller, wherein
the moving roller is movable in a direction intersecting with the conveyance direction of the sheet, and adjusts the tension of the sheet.

8. The printing apparatus according to claim 7, wherein the load applying unit includes an air cylinder configured to apply pressure to the moving roller using compressed air.

9. The printing apparatus according to claim 1, wherein
the first switching unit includes:
a driving roller configured to convey the sheet; and
a nip roller configured to press the driving roller with the sheet interposed therebetween, wherein
the nip roller makes pressure contact with the sheet and presses the driving roller to shut off transmission of the tension of the sheet, and
the nip roller is separated from the driving roller to permit the transmission of the tension of the sheet.

10. A printing apparatus comprising:
a sheet conveying apparatus including
a supply unit configured to supply a sheet;
a first switching unit disposed on a conveyance path of the sheet and configured to switch between a state where the sheet supplied by the supply unit is nipped and a state where the nipping of the sheet is released;
a first tension applying unit disposed on one side of the first switching unit in a conveyance direction of the conveyance path and configured to apply tension to the sheet; and
a detection unit disposed on the other side of the first switching unit in the conveyance direction of the conveyance path and configured to detect the tension of the sheet;
a second switching unit configured to switch between a state of nipping the sheet and a state of releasing the nipping of the sheet on the downstream side of the first switching unit in the conveyance direction; and
a second tension applying unit configured to apply tension to the sheet on the downstream side of the second switching unit in the conveyance direction; and
a printing unit configured to perform printing on the conveyed sheet, wherein
in a state where the nipping of the sheet is released by the first switching unit, the first tension applying unit adjusts the tension of the sheet while the detection unit detects the tension of the sheet, and the first tension applying unit is disposed upstream of the first switching unit with respect to the conveyance direction.

11. The printing apparatus according to claim 10, wherein the printing unit is disposed upstream of the detection unit with respect to the conveyance direction.

12. The printing apparatus according to claim 10, wherein the printing unit includes a printing head configured to eject ink onto the sheet, the printing head is movable between a printing position and a retracted position, and the printing head is in the retracted position in a case of adjusting the tension of the sheet, and is in the printing position in a case of printing on the sheet.

13. A printing apparatus comprising:

a sheet conveying apparatus including:

a supply unit configured to supply a sheet;

a switching unit disposed on a conveyance path of the sheet and configured to switch between a state where the sheet supplied by the supply unit is nipped and a state where the nipping of the sheet is released;

a tension applying unit disposed on one side of the switching unit in a conveyance direction of the conveyance path and configured to apply tension to the sheet; and a detection unit disposed on the other side of the switching unit in the conveyance direction of the conveyance path and configured to detect the tension of the sheet; and a printing unit configured to perform printing on the conveyed sheet, wherein in a state where the nipping of the sheet is released by the switching unit, the tension applying unit adjusts the tension of the sheet while the detection unit detects the tension of the sheet.

14. A sheet tension adjustment method comprising the steps of:

defining a plurality of sections in the sheet conveyance path;

detecting sheet tension values in a plurality of adjacent sections among the plurality of sections, and comparing the detected values with a first tension value;

adjusting the tension of the sheet so that the detected tension value is equal to the first tension value, and setting the adjusted tension value as a tension value in a first section, which is one of the plurality of adjacent sections;

detecting sheet tension values in the plurality of adjacent sections excluding the first section among the plurality of sections, and comparing the detected values with a second tension value; and adjusting the tension of the sheet so that the detected tension value is equal to the second tension value, and setting the adjusted tension value as a tension value in a second section, which is one of the plurality of adjacent sections excluding the first section.

15. A sheet conveying apparatus comprising:

a supply unit configured to supply a sheet;

a switching unit disposed on a conveyance path of the sheet and configured to switch between a state where the sheet supplied by the supply unit is nipped and a state where the nipping of the sheet is released;

a tension applying unit disposed on one side of the switching unit in a conveyance direction of the conveyance path and configured to apply tension to the sheet; and a detection unit disposed on the other side of the switching unit in the conveyance direction of the conveyance path and configured to detect the tension of the sheet, wherein in a state where the nipping of the sheet is released by the switching unit, the tension applying unit adjusts the tension of the sheet while the detection unit detects the tension of the sheet.

* * * * *